United States Patent
Bauditsch et al.

(10) Patent No.: US 12,095,103 B2
(45) Date of Patent: Sep. 17, 2024

(54) ACTIVE MATERIAL CONTAINER, BATTERY HOUSING, AND METHOD FOR MOUNTING THE ACTIVE MATERIAL CONTAINER IN THE BATTERY HOUSING

(71) Applicant: MANN+HUMMEL GmbH, Ludwigsburg (DE)

(72) Inventors: Peter Bauditsch, Boennigheim (DE); Stephan Niemeyer, Steinheim (DE); Daniel Volkmer, Hemmingen (DE); Jochen Linhart, Schwaikheim (DE); Michael Harenbrock, Ludwigsburg (DE); Heinz Dobusch, Freudental (DE); Richard Bernewitz, Koenigsbach-Stein (DE); Maximilian Bauch, Boennigheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 608 days.

(21) Appl. No.: 17/392,901

(22) Filed: Aug. 3, 2021

(65) Prior Publication Data

US 2021/0367285 A1    Nov. 25, 2021

Related U.S. Application Data

(63) Continuation of application No. PCT/EP2020/050636, filed on Jan. 14, 2020.

(30) Foreign Application Priority Data

Feb. 4, 2019    (DE) .................. 10 2019 102 680.6

(51) Int. Cl.
*H01M 50/20* (2021.01)
*B01D 53/04* (2006.01)
*B01D 53/26* (2006.01)

(52) U.S. Cl.
CPC ........ *H01M 50/20* (2021.01); *B01D 53/0407* (2013.01); *B01D 53/261* (2013.01); *B01D 2253/102* (2013.01); *B01D 2253/108* (2013.01); *B01D 2257/404* (2013.01);
(Continued)

(58) Field of Classification Search
None
See application file for complete search history.

(56) References Cited

U.S. PATENT DOCUMENTS

2013/0183894 A1*  7/2013  Watanabe ............ B01D 53/261
                                                   454/159
2014/0199566 A1   7/2014  Gless
(Continued)

FOREIGN PATENT DOCUMENTS

CN    201542088 U    8/2010
CN    202058935 U    11/2011
CN    204284142 U    4/2015
(Continued)

*Primary Examiner* — Jason M Greene

(57) ABSTRACT

An active material container for a functional housing has an air-permeable casing with an interior and an active material arranged inside the interior. One or more rim-side guide elements are arranged at the air-permeable casing and are provided to linearly slidably guide the active material container in an insertion direction in corresponding guide elements of a receptacle of the functional housing. The functional housing is preferably a battery housing.

17 Claims, 4 Drawing Sheets

(52) U.S. Cl.
   CPC .. *B01D 2257/502* (2013.01); *B01D 2257/504* (2013.01); *B01D 2257/702* (2013.01)

(56) References Cited

U.S. PATENT DOCUMENTS

2014/0287282 A1    9/2014  Beylich et al.
2016/0372726 A1*  12/2016  Baldwin ............ H01M 50/204

FOREIGN PATENT DOCUMENTS

| | | |
|---|---|---|
| CN | 108812638 A | 11/2018 |
| CN | 208385470 U | 1/2019 |
| DE | 6911879 U | 9/1969 |
| JP | S63162022 A | 7/1988 |

\* cited by examiner

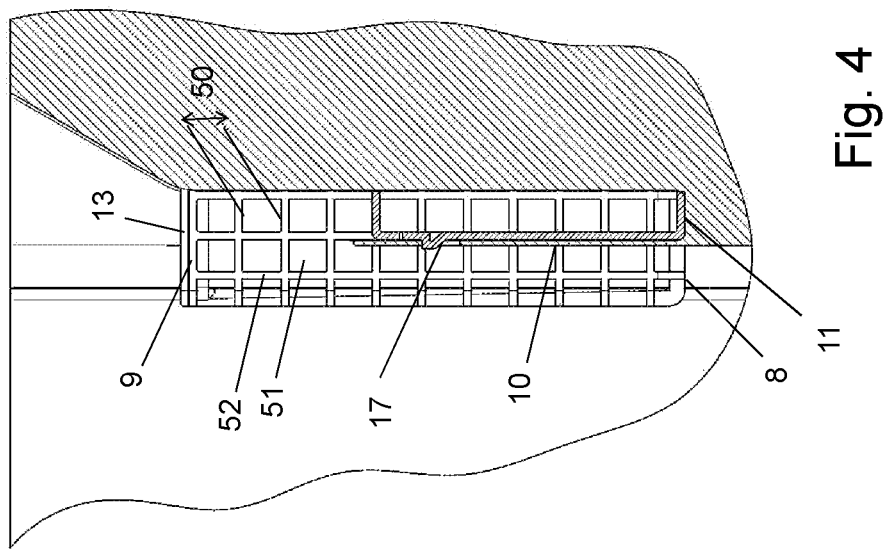
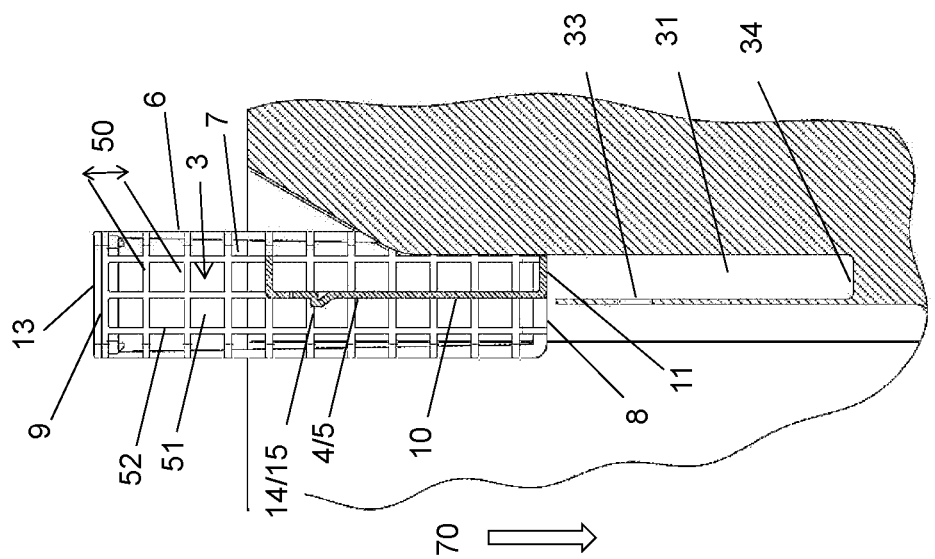

ACTIVE MATERIAL CONTAINER, BATTERY HOUSING, AND METHOD FOR MOUNTING THE ACTIVE MATERIAL CONTAINER IN THE BATTERY HOUSING

CROSS-REFERENCE TO RELATED APPLICATIONS

This application is a continuation application of international application No. PCT/EP2020/050636 having an international filing date of 14 Jan. 2020 and designating the United States, the international application claiming a priority date of 4 Feb. 2019 based on prior filed German patent application No. 10 2019 102 680.6, the entire contents of the aforesaid international application and the aforesaid German patent application being incorporated herein by reference.

BACKGROUND OF THE INVENTION

The present invention concerns an active material container for use in a functional housing, in particular a battery housing, wherein the active material container comprises an air-permeable casing with an interior and an active material arranged inside the interior. The invention also concerns a battery housing and a method for mounting the active material container in the battery housing.

It is known to arrange an active material, in particular a drying agent, e.g. in a sachet, in a battery housing.

Inter alia, the possibility of positioning the sachet, which is usually supported loosely or only jammed in the housing, is disadvantageous in this respect. This is undesirable for many reasons.

SUMMARY OF THE INVENTION

Therefore, it is the object of the present invention to provide an active material container which can be arranged, in particular exchangeably, in a battery housing.

Moreover, a battery housing is to be provided which facilitates receiving and positioning of the active material container.

Finally, a method according to the invention for mounting the aforementioned active material container in the battery housing is presented.

An active material container according to the invention for use in a functional housing, in particular a battery housing, comprises an air-permeable casing with an interior and an active material which is preferably arranged within the interior.

The active material container comprises rim-side guide means, in particular guide rails, for linear slidable guiding of the active material container in corresponding guide means, in particular guide slots, of a receptacle of the functional housing, in particular battery housing.

The active material container enables thus a safe positioning and support of the active material, be it as bulk material or e.g. packaged in an air-permeable sachet, within the housing.

Advantageous embodiments of the invention are subject matter of the dependent claims.

The rim-side guide means extend especially particularly preferred in an insertion direction. In this way, a fast and simple mounting of the active material container is ensured. Preferably, the active material container is a thread-free device which can be mounted with significantly reduced expenditure compared to active material containers of the prior art which rely on threads as fastening means.

The casing can advantageously comprise at least one lattice-shaped wall section or a lattice-shaped wall.

For an advantageous air permeability, the lattice-shaped wall section or the lattice-shaped wall can comprise an average lattice mesh width of more than 0.5 mm, preferably at least 1 mm.

The casing can be configured in particular as a lattice housing so that the air permeability is additionally improved.

The lattice stays of the casing or of the lattice-shaped wall section or of the wall of the casing can have a thickness in this context of at least 0.8 mm, preferably 1-3 mm, for a particularly preferred mechanical stability.

The aforementioned guide means can be embodied preferably as two guide rails arranged at walls of the active material container facing away from each other. This enables a particularly simple and safe handling during mounting and demounting of the active material container because the risk of tilting or canting is minimized thereby. The guide rails extend in particular radially away from the walls.

The casing can be configured in a basket shape and comprise an insertion opening for exchange of the active material contained in the interior, wherein an exchange is realized in an insertion direction or push-in direction and wherein the active material container comprises a cover for closing the insertion opening.

In a preferred further embodiment, at least one rim-side guide rail can comprise a locking means, in particular at least one locking tongue.

The rim-side guide rails can be embodied preferably in an arc shape, wherein a central segment of the guide rails extends parallel to the insertion direction and wherein the guide rails preferably comprise locking tongues in the region of the central segment.

Herein, "arc shape" is to be understood as such geometries of the guide rails which not only comprise a section extending parallel to the insertion direction but at least a further section that extends with at least one directional component transversely to the insertion direction. "Arc shape" does not imply that a transition between a section in the insertion direction and the further section must be bent with a transverse component, but encompasses also such embodiments in which the section in the insertion direction and the section with a transverse component are positioned at a right angle relative to each other, for example, in an L-shaped or C-shaped arrangement.

The locking tongues can comprise at a first spring end at least one locking means for locking, preferably one or a plurality of locking noses, and at a second end can be connected to the central segment of the guide rail. In this way, the locking tongues can be bent slightly upon mounting and demounting and can return into the initial position upon reaching the end position or the locking position.

The cover can be arranged advantageously detachably at the casing. The arrangement of the cover can be achieved by locking or clamping with the basket-shaped or cup-shaped casing.

The active material container can comprise advantageously an air-permeable fiber receptacle, e.g. a nonwoven sachet or nonwoven receptacle, which is arranged in the casing.

The fiber receptacle can comprise at least a first material layer of nonwoven material and at least a second material layer of nonwoven material, wherein between the material layers a cavity is formed. The latter is filled with an active material.

The fiber receptacle can comprise in addition an air-permeable filter region and a rim region that is reinforced at least in sections thereof. The rim region that is reinforced at least in sections thereof can comprise circumferentially or in a reinforced partial region a reduced air permeability compared to the filter region.

The rim region serves in this context for additional stabilization of the fiber receptacle and for its positioning in the active material container.

The active material can comprise at least one drying agent and/or an adsorbent agent for harmful gases. Preferably, active carbon and/or zeolite or a different adsorbent agent for CO, $CO_2$, and $NO_X$ (nitrogen oxides) and/or HC (hydrocarbons), as needed also $H_2O$, can be employed. In a particularly preferred embodiment, the active material container is therefore a drying agent container.

A battery housing according to the invention comprises the active material container according to the invention, wherein the battery housing comprises a receptacle for positioning the active material container in the battery housing.

The battery housing-associated receptacle comprises edge-side corresponding guide means, in particular guide slots, which correspond with the rim-side guide means, in particular guide rails, of the active material container in such a way that the corresponding guide rails and guide slots interact in order to achieve a linear slidable guiding of the active material container in the receptacle of the battery housing.

In an alternative embodiment, the arrangement of the guide rails and guide slots can also be reversed, i.e., the active material container has guide slots and the battery housing-associated receptacle has guide rails; this is encompassed expressly by the present invention.

With a corresponding adaptation of the dimensions of the receptacle and of the active material container, a particularly beneficial positioning of the active material container in a battery housing is achieved without the active material container projecting into the installation space of the battery housing.

A respective guide rail and a guide slot can advantageously comprise, or provide in interaction, an interface, which is formed by a locking cutout and a locking nose, for limiting the mutual linear slidability. The locking cutout and the locking nose can be arranged selectively at the guide slot or at the corresponding guide rail.

Mounting of the active material container according to the invention in the battery housing according to the invention is realized according to the invention in a linear sliding action, in particular in the insertion direction, into the receptacle of the battery housing into an end position, wherein the active material container, preferably in the end position, is locked in the receptacle.

BRIEF DESCRIPTION OF THE DRAWINGS

Further advantages, features, and details of the invention will be described in the following description in which an embodiment of the invention will be explained in more detail with the aid of the accompanying drawings. A person of skill in the art will expediently consider the features disclosed in the drawings, the description, and the claims in combination also individually and combine them to expedient further combinations.

FIG. 2 shows a side view of FIG. 1.

FIG. 4 shows a side view of FIG. 3.

DESCRIPTION OF PREFERRED EMBODIMENTS

Figure 1:
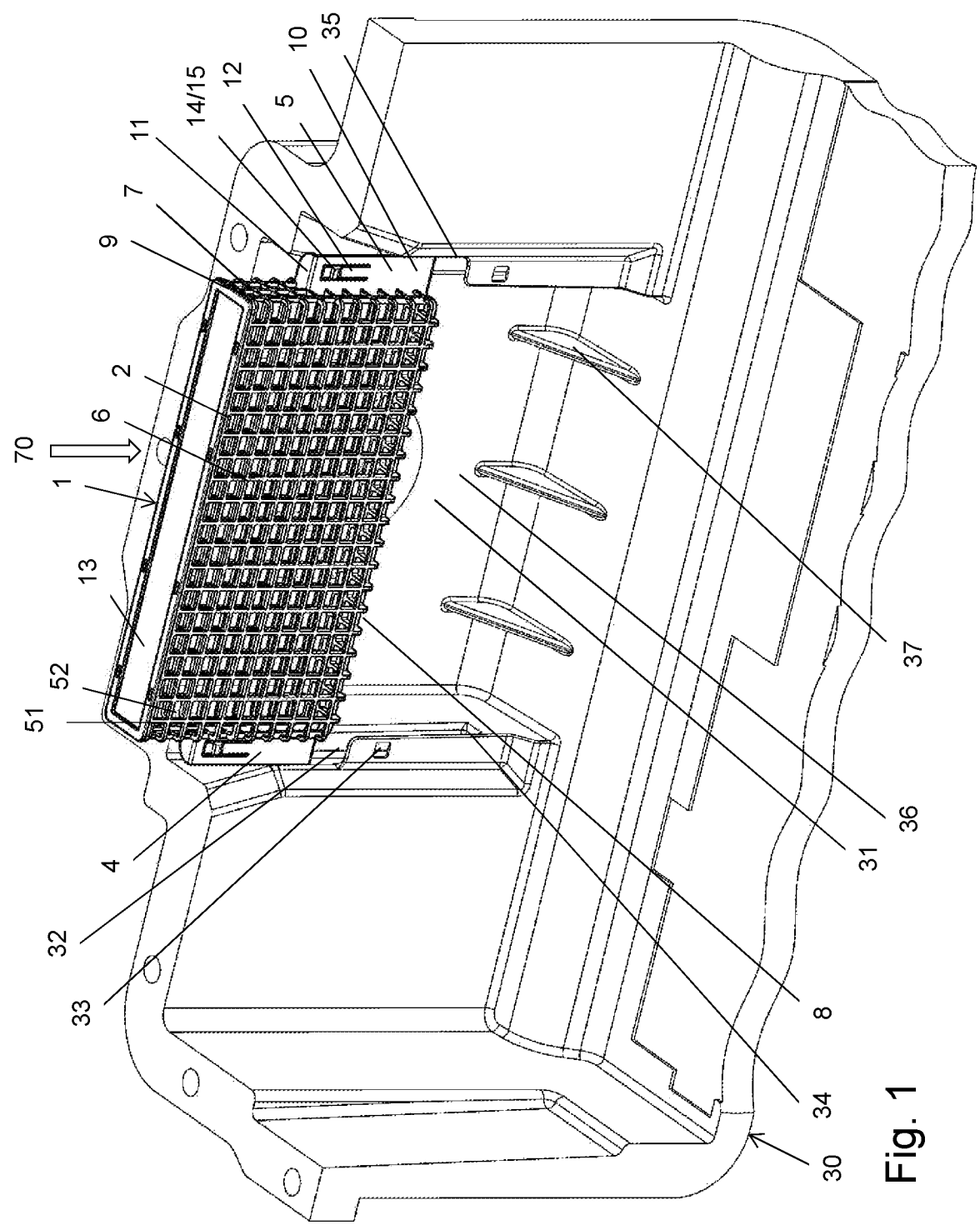
FIG. 1 shows a perspective view of a detail of a battery housing and an active material housing for arrangement in a receptacle in the battery housing prior to its arrangement in the receptacle.
Figure 3:
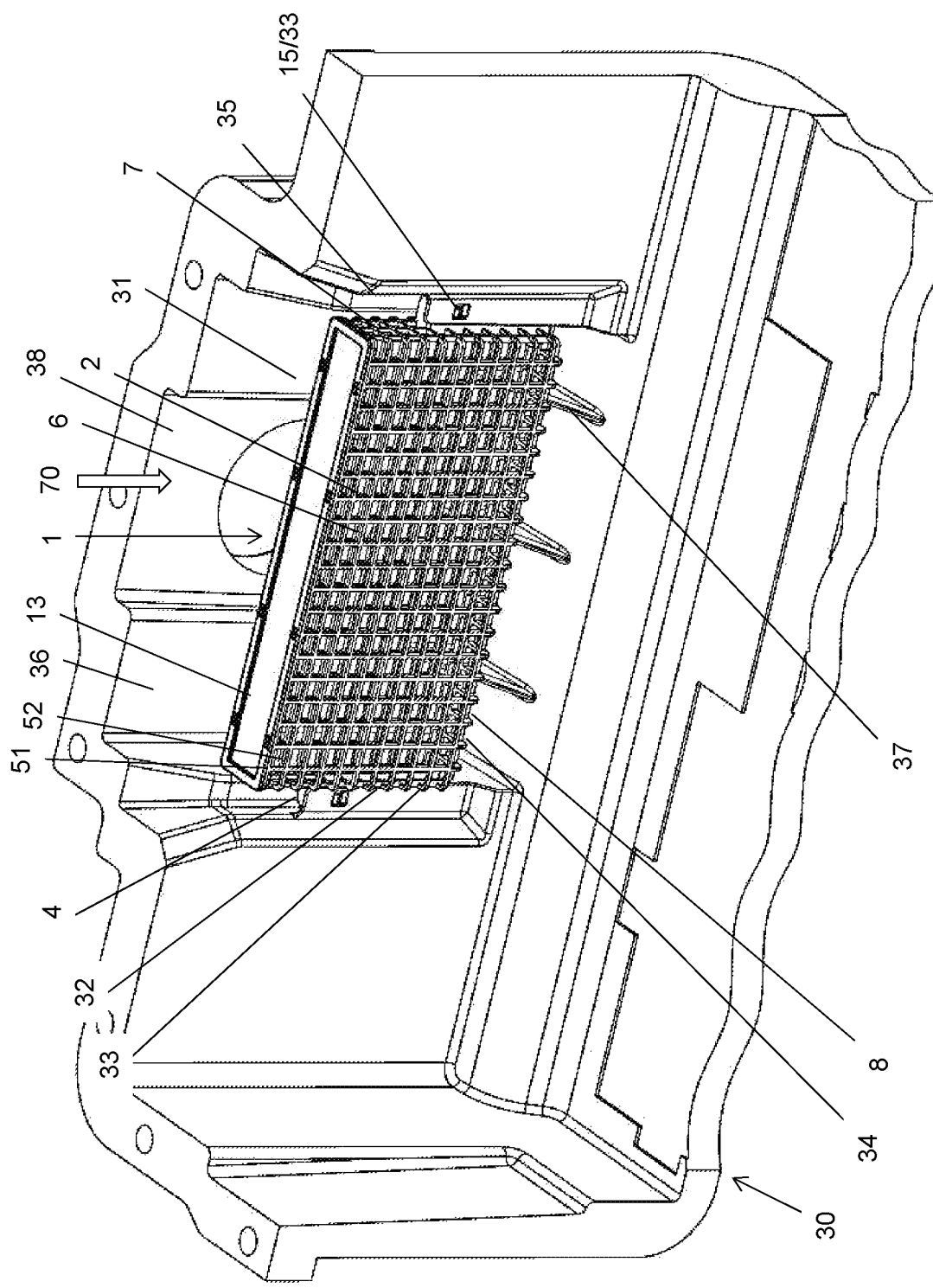
FIG. 3 shows a perspective view of a detail of a battery housing and of the active material housing with the active material housing in an end position in the receptacle.

FIGS. 1-4 show in detail and in several views a battery housing 30 according to the invention and an active material container 1 according to the invention.

The active material container 1 comprises a casing 2. The casing 2 is embodied in a basket shape and comprises a bottom 8, two main walls 6, and two sidewalls 7. The main walls 6 comprise in this context a larger surface area, preferably at least twice as large, than the sidewalls 7. The casing 2 is configured as a lattice housing and comprises thus on all sides a lattice structure. It is however also possible that only individual walls 6, 7, 8, in particular at least one main wall 6 or only wall sections of the walls 6, 7, 8, are configured as lattice structures. The aforementioned surface area of a wall comprises the surface area of the lattice structure as well as the surface area of the intermediately positioned free spaces or lattice meshes.

The casing 2 delimits an interior 3 in which an active material is introduced.

Figure 5:
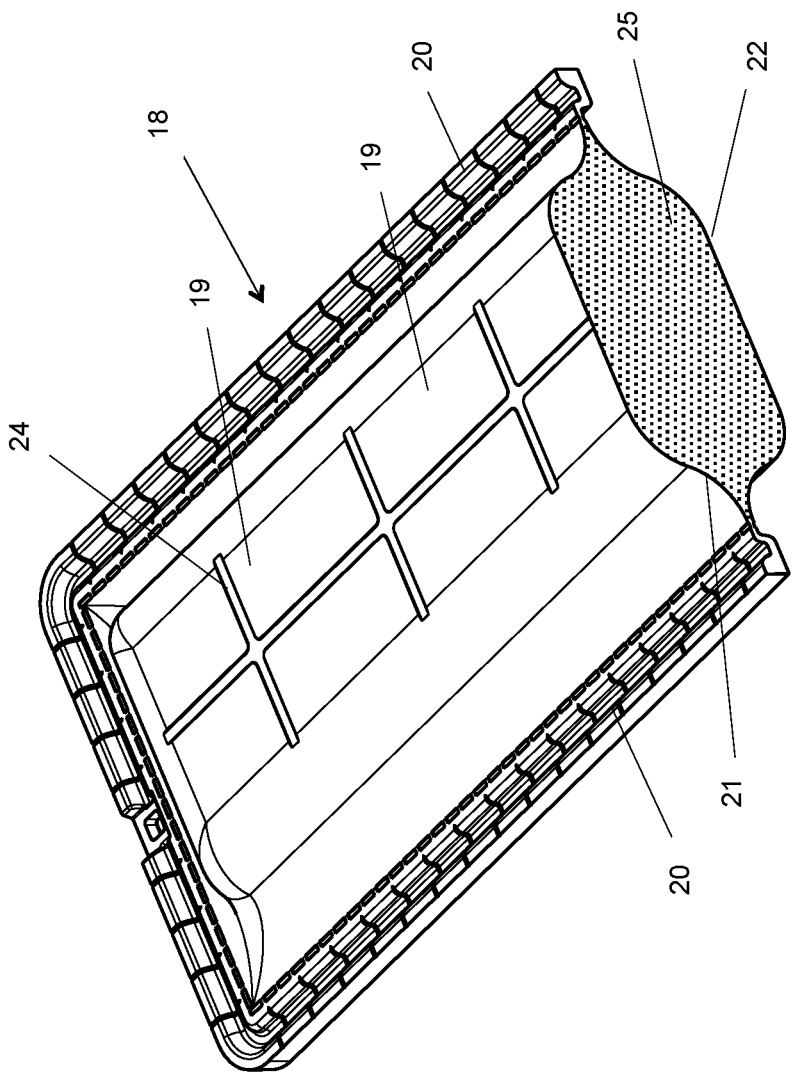
FIG. 5 shows a fiber container for positioning in the active material housing.

The active material can be arranged in an arbitrary configuration in the interior 3. For example, the active material can be introduced as bulk material or exchangeably in an air-permeable fiber receptacle 18 which is illustrated in FIG. 5 in an embodiment variant. The fiber receptacle 18 comprises a central filter region 19 and comprises in this context at least two air-permeable nonwoven layers that are fused together as material layers 21 and 22 and a cavity 23 therebetween which is filled with the active material 25 partially or completely.

For facilitating the positioning of the active material, the fiber receptacle 18 can comprise in addition a reinforced rim region 20. Moreover, the fiber receptacle 18 comprises a central arrangement of reinforcement ribs 24.

For introducing the active material in the insertion direction 70 into the casing 2, the casing 2 comprises an insertion opening 9. The latter is closed by a cover 13 which is detachably arranged at the casing 2. This can be done e.g. by a locking action. The casing 2 comprises accordingly locking cutouts in the region of the insertion opening 9.

From each one of the two sidewalls 7, a guide means 4 is projecting which serves for guiding and holding the casing 2 inside a receptacle 31 of the battery housing 30. In FIGS. 1-4, it is embodied as a guide rail 5. The guide rail 5 enables in particular guiding of the casing 2 in interaction with guide slots 32 which are arranged at the edges in the receptacle 31 into which the casing 2 is insertable in an insertion direction 70.

The guide rail 5 comprises a central segment 10 which extends parallel to the sidewall 7, thus parallel to the insertion direction 70. For stabilization and for positioning within the respective guide slot 32 perpendicularly to the insertion direction 70 in the battery housing 30, the guide rail 5 comprises in addition two end sections 11 which extend perpendicularly to the insertion direction 70 and to the central segment 10. As a whole, the guide rail 5 is embodied in an arc shape of central section 10 and the two end sections 11 and is connected with its longitudinal side to the sidewall 7. In this context, an end section 11 forms in addition a stop with a slot bottom 34 of the guide slot 32, as can be seen best in FIG. 4.

At the same level as the central segment 10, the guide rail 5 comprises a locking tongue 12. The locking tongue 12 is connected at one end to the central segment 10 and comprises at the opposite side a springy end 14, 15.

A locking nose 15 is projecting away from the locking tongue 12 at a slant perpendicularly to the insertion direction 70 and thus also at a slant to the central segment 10. The locking tongue 12 and the locking nose 15 thus form together a locking means 14 for preventing a sliding action of the casing 2 and thus of the entire active material container 1 in insertion direction within the guide slots 32.

The receptacle 31 in the battery housing 30 is divided into three sides: two edge sides 35 and a backside 36 which at the same time are a part of a housing wall of a battery housing 30 delimiting the battery housing in relation to the environment. The housing wall comprises in this context a substantially uniform wall thickness in the region of the receptacle compared to neighboring regions.

The guide slots 32 are embodied in this context in a U-shape, wherein the guide slots 32 are arranged along the edge sides 35 such that the openings of the U-shape face each other.

In the following, reference is being had to a lower region and to an upper region of the receptacle 31, wherein the guide slots 32 in relation to the upper region are open in such a way that the guide rails 5 can be threaded into the guide slots 32 in this region.

The receptacle 31 comprises in addition in the lower region, in particular at the bottom of the receptacle 31, guide ribs 37 which enable an air supply and/or air discharge of air which exits through the main wall 6 which is facing the backside 36 of the receptacle. In this context, the bottom 8 of the casing 2 in the inserted end position can hit the guide ribs 37. Alternatively or additionally, the end sections of the guide rails 4, 5 which are facing in the insertion direction 70 toward the interior of the battery housing 30 can serve as a stop in that they contact in an end position a corresponding counter element of the guide slots 32 of the battery housing 30.

The receptacle 31 comprises in addition along the backside 36 a partial section 38 which is recessed relative to the remaining region of the backside 36. The guide slots 32 have in addition locking cutouts 33 which correspond with the locking noses 15 and interact with them.

A respective locking nose 15 and locking cutout 33 form thus an interface 17. It is understood that the interface 17 can also be embodied in reverse so that the locking tongue and the locking nose can be part of the boundary of the guide slot and the locking cutout can be arranged in the guide rail.

Also, alternatively, the guide slot and corresponding boundary walls can be arranged at the sidewall 7 of the casing 2 and the receptacle can comprise corresponding guide rails.

The casing 2 is embodied to be air-permeable. For this purpose, the casing comprises selectively lattice-shaped wall sections or lattice-shaped walls. The casing is embodied in FIGS. 1-4 as lattice housing so that all walls are embodied lattice-shaped.

Lattice-shaped means in the context of the present invention in particular that lattice meshes 51 between lattice stays 52 are present through which air flow in or air flow out of the interior 3 of the casing 2 is possible, which can be seen best in FIG. 2. The lattice meshes 51 can be preferably embodied rectangular and in particular square. The lattice mesh width 50 in the meaning of the present invention is the largest distance of two parallel extending lattice stays 52 in case of rectangularly arranged lattice stays 52.

In other forms, for example, triangular or pentagonal lattice meshes, the lattice mesh width is the bisecting line of the surface with the greatest possible extension.

The aforementioned average lattice mesh width 50 can amount to more than 0.5 mm, preferably at least 1 mm. In this context, the average lattice mesh width 50 is the average value of all same-type lattice meshes of the wall section or the wall.

The lattice stays 52 of the casing 2 have a thickness of preferably at least 0.8 mm, preferably 1-3 mm.

The casing 2 can be comprised preferably of plastic material or of a plastic metal combination wherein the metal can be preferably provided as a lattice-shaped wall section.

What is claimed is:

1. An active material container for a functional housing, the active material container comprising:
   a casing being air-permeable and comprising an interior;
   an active material arranged inside the interior; and
   a guide rail arranged at the casing and configured to linearly slidably guide the active material container in an insertion direction in a guide slot of a receptacle of the functional housing, the guide rail comprising a locking tongue arranged at a central segment of the guide rail.

2. The active material container according to claim 1, wherein the guide rail extends in the insertion direction.

3. The active material container according to claim 1, wherein the casing comprises walls that are facing away from each other, and
   the guide rail is arranged at each of the walls.

4. The active material container according to claim 1, wherein the casing comprises at least one lattice-shaped wall section or a lattice-shaped wall.

5. The active material container according to claim 4, wherein the at least one lattice-shaped wall section or the lattice-shaped wall comprises an average lattice mesh width of more than 0.5 mm.

6. The active material container according to claim 4, wherein the casing is a lattice housing.

7. The active material container according to claim 4, wherein the at least one lattice-shaped wall section or the lattice-shaped wall comprises lattice stays comprising a thickness of at least 0.8 mm.

8. The active material container according to claim 1, wherein the guide rail extends away in a radial direction from a wall of the casing.

9. The active material container according to claim 1, wherein the casing is embodied in a basket shape and further comprises an insertion opening configured to enable an exchange of the active material in the interior of the casing, the exchange of the active material being in the insertion direction, and
   the active material container comprises a cover configured to close the insertion opening.

10. The active material container according to claim 1, wherein the guide rail is embodied in an arc shape, and
    the central segment of the guide rail extends parallel to the insertion direction.

11. The active material container according to claim 1, wherein the locking tongue comprises:

a first springy end comprising a locking nose; and a second end connected to the central segment of the guide rail.

12. The active material container according to claim 1, further comprising a fiber receptacle arranged in the casing, the fiber receptacle comprising at least one first material layer of nonwoven material and at least one second material layer of nonwoven material, between the at least one first material layer and the at least one second material layer, a cavity is formed, the cavity being at least partially filled with the active material, and the fiber receptacle further comprises an air-permeable filter region and an at least partially reinforced rim region comprising a reinforced partial region, the reinforced partial region comprising a reduced air permeability in comparison to the air-permeable filter region.

13. The active material container according to claim 1, wherein the active material comprises or is comprised of at least one drying agent and/or an adsorbent agent for harmful gases.

14. The active material container according to claim 1, wherein the active material comprises any one or any combination of active carbon, zeolite, and an adsorbent agent for CO, $CO_2$, NOx and/or hydrocarbons.

15. A battery housing comprising:

a receptacle comprising a guide slot; and an active material container comprising:
   a casing being air-permeable and comprising an interior;
   an active material arranged inside the interior; and
   a guide rail arranged at the casing and configured to linearly slidably guide the active material container in an insertion direction in the guide slot of the receptacle, the guide rail comprising a locking tongue arranged at a central segment of the guide rail.

16. The battery housing according to claim 15, wherein the guide rail and the guide slot interact to achieve a linear slidable guiding action of the active material container in the receptacle.

17. The battery housing according to claim 16, wherein the guide rail and the guide slot comprise an interface, comprising a locking cutout and a locking nose interacting with the locking cutout to limit a mutual linear slidability of the guide rail and the guide slot.

* * * * *